(12) United States Patent
McCullough et al.

(10) Patent No.: US 8,265,801 B2
(45) Date of Patent: Sep. 11, 2012

(54) VISUAL DISPLAY SYSTEM FOR AN AIRCRAFT

(75) Inventors: Susan L. McCullough, Glendale, AZ (US); Mark A. Pearson, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 324 days.

(21) Appl. No.: 11/603,765

(22) Filed: Nov. 22, 2006

(65) Prior Publication Data

US 2008/0119969 A1 May 22, 2008

(51) Int. Cl.
*G01C 23/00* (2006.01)

(52) U.S. Cl. .......... 701/3; 701/428; 715/273; 345/501; 340/945

(58) Field of Classification Search .......... 701/14, 701/24, 11, 13, 16, 3, 428; 345/157, 168, 345/184, 501; 715/273; 340/945
See application file for complete search history.

(56) References Cited

U.S. PATENT DOCUMENTS

| | | | | |
|---|---|---|---|---|
| 4,642,775 A | * | 2/1987 | Cline et al. | 701/528 |
| 4,845,495 A | * | 7/1989 | Bollard et al. | 340/973 |
| 6,112,141 A | * | 8/2000 | Briffe et al. | 701/14 |
| 6,144,619 A | * | 11/2000 | Reisman | 368/10 |
| 6,842,122 B1 | * | 1/2005 | Langner et al. | 340/945 |
| 6,980,198 B1 | | 12/2005 | Gyde et al. | |
| 2003/0033332 A1 | * | 2/2003 | Lindsley | 707/526 |
| 2003/0093187 A1 | | 5/2003 | Walker | |
| 2003/0236836 A1 | * | 12/2003 | Borthwick | 709/204 |
| 2007/0046680 A1 | | 3/2007 | Hedrick et al. | |
| 2007/0265896 A1 | * | 11/2007 | Smith | 705/7 |
| 2008/0119969 A1 | * | 5/2008 | McCullough et al. | 701/3 |

FOREIGN PATENT DOCUMENTS

| | | |
|---|---|---|
| EP | 1701255 A1 | 9/2006 |
| WO | 2005041033 A2 | 5/2005 |

OTHER PUBLICATIONS

PCT Search Report, PCT/US2007/085162 dated July 21, 2008.

* cited by examiner

*Primary Examiner* — Redhwan K Mawari
(74) *Attorney, Agent, or Firm* — Ingrassia Fisher & Lorenz, P.C.

(57) ABSTRACT

A visual display system includes a monitor for displaying a visual display; a memory having a user application definition file containing information related to the visual display; and a processor coupled to the monitor and the memory, the processor configured to receive runtime parameters from a flight management system and provide the visual display to the monitor based on the runtime parameters and the user application definition file. The visual display includes at least one hotkey.

8 Claims, 3 Drawing Sheets

VISUAL DISPLAY SYSTEM FOR AN AIRCRAFT

FIELD OF THE INVENTION

The present invention generally relates to a visual display system for an aircraft, and more particularly, the present invention relates to a visual display system that produces a display with at least one hotkey for directly accessing a desired screen page.

BACKGROUND OF THE INVENTION

Many aircraft have a visual display system that displays a number of different screen pages in which the user can obtain information or perform a function. Generally, a user must scroll through a hierarchy of screen pages to obtain a desired screen page. This process is time consuming and inefficient, particularly because certain users will often request a particular screen page. At times, a manufacturer of the visual display system may provide a few keys that enable a user to go directly to desired screen pages. However, the screen pages visited often by a particular user will vary according to the user. As a result, the keys directly linked to screen pages are often not useful to a particular user. The addition and/or modification of the keys with direct links to particular pages may entail enormous costs, typically on the order of one million dollars per key.

Accordingly, it is desirable to provide a visual display system for an aircraft having hotkeys that provide a direct link to screen pages that can be efficiently assigned by the user. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A visual display system includes a monitor for displaying a visual display; a memory having a user application definition file containing information related to the visual display; and a processor coupled to the monitor and the memory, the processor configured to receive runtime parameters from a flight management system and provide the visual display to the monitor based on the runtime parameters and the user application definition file. The visual display includes at least one hotkey.

A method for displaying a visual display in an aircraft includes defining at least one hotkey in an airline modifiable information file; loading the an airline modifiable information file into a flight management system; providing runtime information based on the airline modifiable information file to a visual display system; and producing the visual display with at least one hotkey based on the runtime information.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
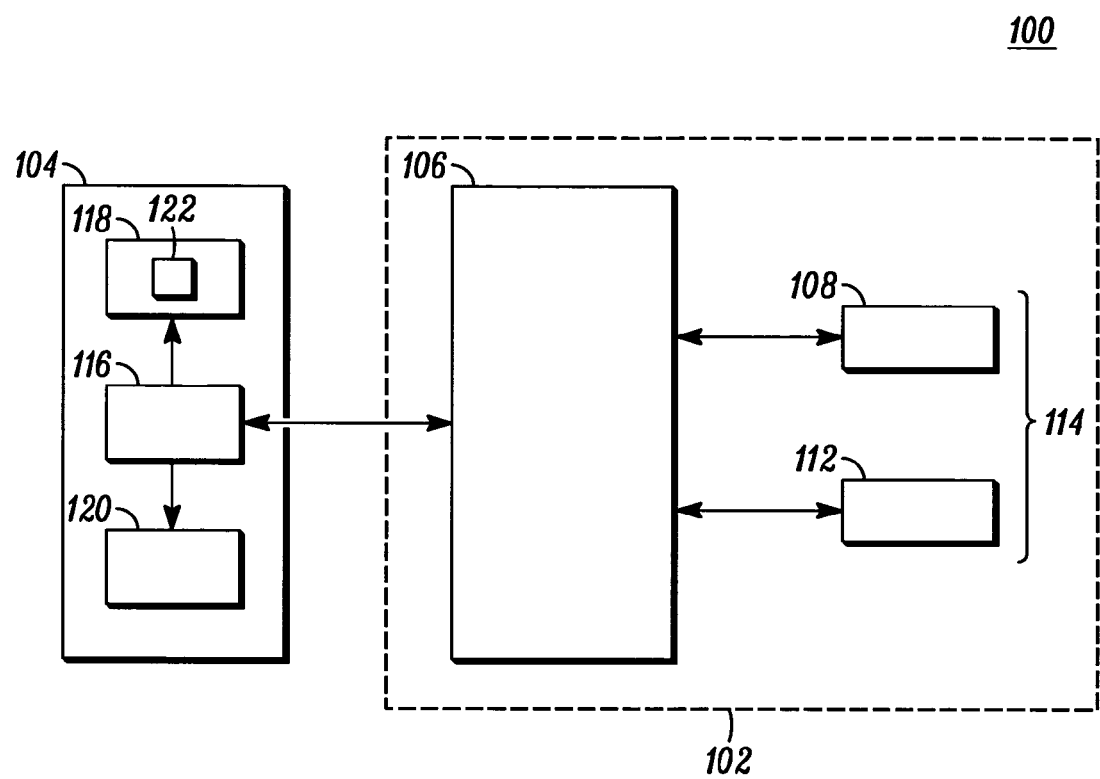
FIG. 1 is a schematic representation of an aircraft system with a visual display system in accordance with one embodiment of the present invention.

Referring to FIG. 1, an aircraft system 100 in accordance with one embodiment of the present invention includes a visual display system 104 coupled to a flight management system (FMS) 102. The visual display system 104 includes a processor 116 coupled to a memory 118 and a monitor 120. The processor 116 can be a graphics generator that generates a display on the monitor 120 based on data stored in the memory 118. Included among the data that may be stored in the memory 118 is a user application definition file (UADF) 122. The UADF 122 is described in further detail below.

The monitor 120 may include one or more display monitors suitable for displaying various symbols and information. The monitor 120 can include a display system such as, for example, cathode ray tube (CRT), liquid crystal display (LCD), Heads Up Display (HUD), and Helmet Monitored Display (HMD). The monitor 120 is preferably interactive, and as such, includes a touch-screen and/or other mechanism for function, display, and/or cursor control. The monitor 120 can also include a virtual, multifunction keyboard.

The processor 116 encompasses one or more functional blocks used to interact with the flight management system (FMS) 102, the memory 118, and the monitor 120. In this regard, processor 116 may include any number of individual microprocessors, memories, storage devices, interface cards, and other conventional components known in the art.

The flight management system (FMS) 102 includes an FMS processor 106. The FMS processor 106 is configured to communicate with the visual display system 104 and one or more data sources 114. Similar to the display system processor 116, the FMS processor 106 may include any number of individual microprocessors, memories, storage devices, interface cards, and other conventional components known in the art.

The data sources 114 can include avionics data 108 and at least one airline modifiable information (AMI) file 112. Avionics data 108 includes aeronautical information related to the state of the aircraft derived from an aeronautical information database, including, for example, flight plan data, data related to airways, navigational aids, navigational data, obstructions, taxi registration, Special Use Airspace, political boundaries, COM frequencies (en route and airports), approach information, geographical information and the like.

The flight management system (FMS) 102 integrates information from data sources 114 shown in FIG. 1, as well as additional data sources such as input from the pilot or other user, inertial references, navigation radio, and engine and fuel sensors, to perform or assist in functions such as navigation, flight planning, performance management, guidance and control, datalink communications, and display data processing. Particularly, the flight management system (FMS) 102 utilizes the data from the AMI file 112 to provide runtime parameters to the visual display system 104.

The processor 116 of the visual display system 104 reads the UADF 122 in the memory 118 and the runtime parameters provided by the FMS 102 to produce a display on the monitor 120. Generally, the UADF 110 is used to provide the general look and feel of the display, and the runtime parameters from the AMI file 112 in the FMS 102 is used to provide aspects of the display that can be modified by the user or airline, as is discussed further below. Through the use of the monitor or other peripherals of the visual display system 104, the user can interact with the elements displayed on the monitor 120 graphically and/or textually. In one embodiment, the visual display system 104 can be an emulated control display unit (CDU) or a graphically multi-functional display (MFD).

Figure 2:
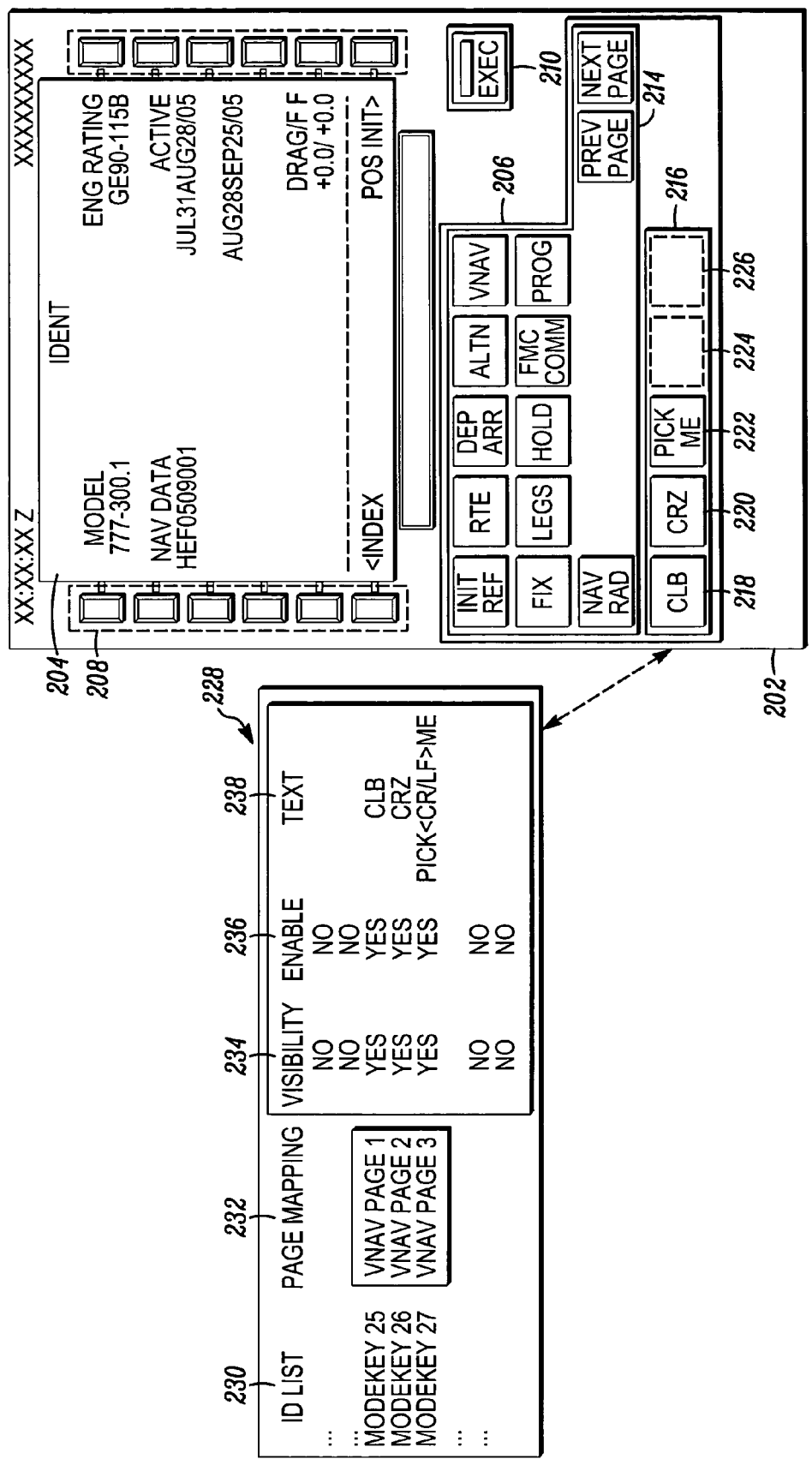
FIG. 2 is a functional display and associated data table of the visual display system of FIG. 1.

Referring additionally to FIG. 2, the display produced by the visual display system 104 on the monitor 120 includes a functional display 202. The functional display 202 includes information relating to navigation and control of the aircraft. Particularly, the functional display 202 includes a display portion 204 for displaying a current screen page. As shown in FIG. 2, the current screen page in the display portion 204 displays an IDENT page, which includes the aircraft configuration and the loaded navigation database information. The current screen page in the display portion 204 can be changed or manipulated by pressing one or more mode keys 206. In this embodiment, the mode keys 206 are graphical, virtual softkeys drawn as buttons on the functional display 202. However, the mode keys 206 can also be represented by any alternative user interface component, such as, for example, a drop down list. The mode keys 206 are each associated with a screen page that can be displayed in the display portion 204 of the functional display 202. Via line select keys 208 along the side of the display portion 204, the user can perform functions associated with the navigation and control of the aircraft specific to the screen page displayed in the display portion 204. The line select keys 208 enable the user to additionally navigate the screens, enter flight plan data, performance data, and navigation data, as well as initiating functions such as printing the flight plan and aligning the inertial reference system. The functional display 202 further includes an execute button 210 that can confirm actions taken in the functional display 202.

The mode keys 206 of the functional display 202 include static keys 214 and hotkeys 216. As noted above, each of the static keys 214 and hotkeys 216 represent screen pages to be displayed on the display portion 204 of the functional display 202. The static keys 214 are set by the FMS 102, stored in the UADF 122 and cannot be changed by the user or purchaser, such as the airline. However, the hotkeys 216 can be defined by the user or airline in the AMI file 112, which can be modified by the airline and stored in the flight management system (FMS) 102. The hotkeys 216 typically correspond to screen pages that are repeatedly visited by the user, but are not represented by the static keys 214.

The functional display 202 of FIG. 2 includes five hotkeys 216, although any number of hotkeys 216 can be provided. Three of the hotkeys 218, 220, 222 have been assigned screen pages, as indicated by the visible labels on each of the hotkeys 218, 220, 222. The two remaining hotkeys 224, 226 have not been assigned screens and are not generally visible to the user of the functional display 202.

The hotkeys 216 are linked to screen pages to be displayed on the display portion 204 by an AMI data table 228, which is represented by the functional block 228 in FIG. 2. The AMI data table 228 forms part of the AMI file 112 illustrated by FIG. 1. The AMI data table 228 includes an ID list 230 that includes a list of possible hotkeys 216 of the functional display 202. As one example, the hotkey 218 is designated in the ID list 230 as "ModeKey 25." Similarly, the hotkey 220 is designated in the ID list 230 as "ModeKey 26," and the hotkey 222 is designated in the ID list 230 as "ModeKey 27." A page mapping list 232 indicates the screen page to be displayed on the display portion 204 of the functional display 202 when a user depresses the respective hotkey 216. The screen pages referenced in the page mapping list 232 can be any screen within the flight management system (FMS) 102 or visual display system 104 that can be accessed by a user. As one example, hotkey 218 is associated with "VNAV Page 1." When a user presses hotkey 218, the display portion 204 will display the screen page labeled "VNAV Page 1." Hotkey 220 and hotkey 222 are associated with "VNAV Page 2" and "VNAV Page 3," respectively.

Turning now to the remainder of the AMI data table 228, the visibility list 234 indicates whether a hotkey 216 is visible to the user. As one example, the visibility list 234 indicates that the hotkeys 218, 220, 222 are visible to a user, whereas the remaining hotkeys 224, 226 are not. The enable list 236 indicates whether a hotkey 216 is enabled to function when the user depresses the hotkey 216. As one example, the enable list 236 indicates that the hotkeys 218, 220, 222 are enabled for use by a user, whereas the remaining hotkeys 224, 226 are not. The text list 238 indicates the labels to be displayed on the hotkeys 216. As one example, hotkey 218 displays a label "CLB," hotkey 220 displays a label "CRZ," and hotkey 222 displays a label "PICK ME."

Accordingly, for each possible hotkey 216, the AMI file 112 designates a hotkey ID in the hotkey ID list 230, the screen associated with the hotkey ID in the page mapping list 232, whether or not the hotkey 216 associated with the hotkey ID is visible in the visibility list 234, whether or not the hotkey 216 associated with the hotkey ID is enabled in the enable list 236, and a label for the hotkey 216 associated with the hotkey ID in the text list 238. Generally, any portion of the functional display 202 not being used by another function can be designated as a hotkey 216, although only hotkeys (e.g., 218, 220, 222) that are designated as visible in the AMI data table 228 will be visible to the user.

Figure 3:
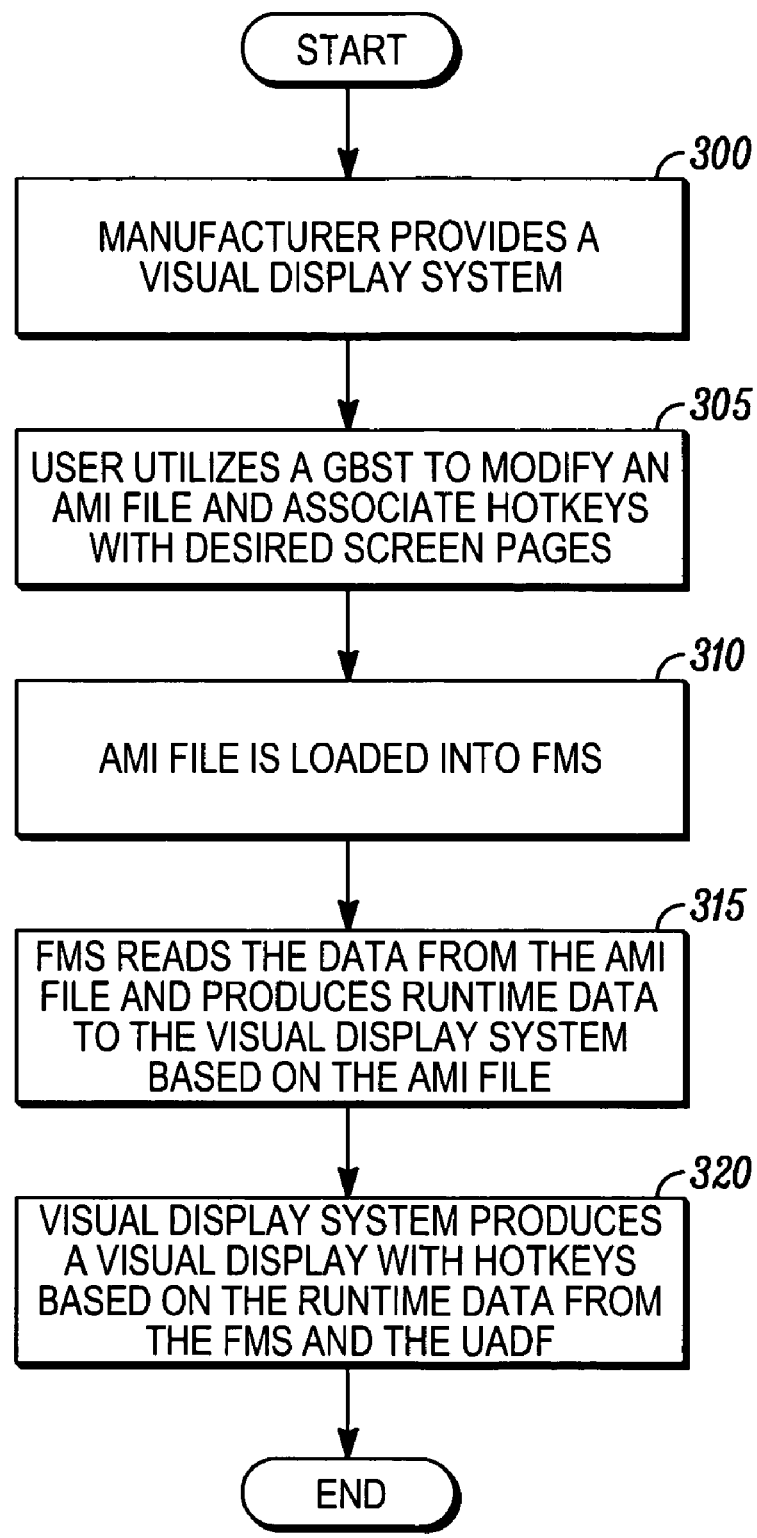
FIG. 3 is a flowchart representing a method for creating and displaying a functional display in a visual display system in accordance with one embodiment of the present invention.

Having described the display system structurally, and generally described its overall functionality, a method for creating and displaying the functional display 202 with the hotkeys 216 on the visual display system 104 will now be described. In doing so, reference should be made to FIG. 3, which depicts the method in flowchart form, and additionally with reference to FIGS. 1 and 2 as needed.

As shown in step 300, a manufacturer provides a visual display system 104 to a user such as an airline. The visual display system 104 typically includes a user application definition file (UADF) 122. The UADF 122 describes how the screen pages should appear on the monitor 120. At this point, the UADF 122 contains the description and placement of generic, undefined hotkeys 216, however the hotkeys 216 are flagged as invisible and therefore will not be displayed unless directed to by the FMS 102.

As shown in step 305, the user utilizes a ground based software tool (GBST) or similar tool to modify the AMI file 112. In an alternate embodiment, the user utilizes a ground based software tool or similar tool to create the AMI file 112. The user modifies or creates the AMI data table 228 in the AMI file 112 to associate a hotkey 216 with a screen page to be displayed in the display portion 204 of the functional display 202. Generally, the user has a list of all the available hotkeys 216 in the ID list 230. The user also has a list of all available screen pages of the flight management system (FMS) 102 or visual display system 104 that can be displayed and accessed directly by the user in the page mapping list 232. The user matches a desired screen page of the page mapping list 232 with a desired available hotkey in the ID list 230. Once such a match is made, the user also designates that the hotkey 216 is visible in the visibility list 234 and enables the hotkey in the enable list 236. The user also provides a label for each hotkey 216 in a text list 238. The label generally provides a visible identifier for the associated screen page. The user repeats the process of step 305 to create as many hotkeys 216 as necessary or desired.

As shown in step 310, the modified AMI file 112 is loaded into the flight management system (FMS) 102.

Then, in step 315, the flight management system (FMS) 102 reads the data in the AMI file 112 and provides runtime parameters to the visual display system 104. The visual display system 104 receives the runtime parameters from the flight management system (FMS) 102, and in step 320, produces a visual display based on runtime data from the FMS 102 from the AMI file 112 and the UADF 122. The visual display includes at least one hotkey 216 defined in the AMI file 112 that provides a direct link to the screen page designated by the user in the AMI file 112.

Although aspects of ARINC 661 standard are discussed herein, the present invention is not limited to aircraft systems that utilize the ARINC 661 standard.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A visual display system comprising:
    a monitor for displaying a visual display;
    a memory having a user application definition file containing information related to the visual display; and
    a processor coupled to the monitor and the memory, the processor configured to receive runtime parameters from a flight management system and provide the visual display to the monitor based on the runtime parameters and the user application definition file, the visual display including at least one hotkey, wherein the at least one hotkey is a direct link to a predefined screen page, the at least one hotkey being directly linked to the predefined screen page in an airline modifiable information file in the flight management system and provided to the processor in the runtime parameters,
    wherein the visual display further comprises at least one static key, the at least one static key and the at least one hotkey representing screen pages for display as the visual display on the monitor, the at least one static key being unmodifiable in the airline modifiable information file and the at least one hotkey being modifiable in the airline modifiable information file,
    wherein the airline modifiable information file includes an airline modifiable information file data table,
    wherein the airline modifiable information data table is configurable by a user to assign a first screen page to a first of the at least one hotkey and to assign a second screen page to a second of the at least one hotkey,
    wherein the airline modifiable information data table includes a hotkey ID list and a page mapping list and the airline modifiable information data table further includes at least one of a visibility list, an enable list, or a text list, and
    wherein the airline modifiable information file is modifiable by the user with a ground based software tool.

2. An aircraft system, comprising:
    a flight management system having a plurality of data sources, the data sources including an aircraft modifiable information file; and
    a visual display system coupled to the flight management system, the visual display system comprising
        a monitor for displaying a visual display,
        a memory having a user application definition file containing information related to the visual display, and
        a processor coupled to the monitor and the memory, the processor configured to receive runtime parameters from the flight management system based on the aircraft modifiable information file and provide the visual display to the monitor based on the runtime parameters and the user application definition file, the visual display including at least one hotkey, wherein the at least one hotkey is a direct link to a predefined screen page, the at least one hotkey being directly linked to the predefined screen page in an airline modifiable information file in the flight management system,
    wherein the visual display further comprises at least one static key, the at least one static key and the at least one hotkey representing screen pages for display as the visual display on the monitor, the at least one static key being unmodifiable in the airline modifiable information file and the at least one hotkey being modifiable in the airline modifiable information file,
    wherein the airline modifiable information file includes an airline modifiable information file data table,
    wherein the airline modifiable information data table is configurable by a user to assign a first screen page to a first of the at least one hotkey and to assign a second screen page to a second of the at least one hotkey,
    wherein the airline modifiable information data table includes a hotkey ID list and a page mapping list and the airline modifiable information data table further includes at least one of a visibility list, an enable list, or a text list, and
    wherein the airline modifiable information file is modifiable by the user with a ground based software tool.

3. The aircraft system of claim 2, wherein the page mapping list associates a screen with a respective hotkey from the hotkey ID list.

4. The aircraft system of claim 2, wherein the airline modifiable information file includes the visibility list and wherein the visibility list designates the visibility for the at least one hotkey.

5. The aircraft system of claim 2, wherein the airline modifiable information file includes the enable list and wherein the enable list designates the enablement for the at least one hotkey.

6. The visual display system of claim 1, wherein the at least one hotkey is a user shortcut to the predefined screen page.

7. The visual display system of claim 1, wherein memory further stores an application data file that defines first characteristics of the visual display, the airline modifiable information file defining second characteristics of the visual display.

8. The visual display system of claim 7, wherein the at least one static key is defined in the application data file.

* * * * *